Aug. 18, 1942.　　　F. W. SAMPSON ET AL　　　2,293,362
FREEZING TRAY
Filed March 10, 1939　　　　　4 Sheets-Sheet 3
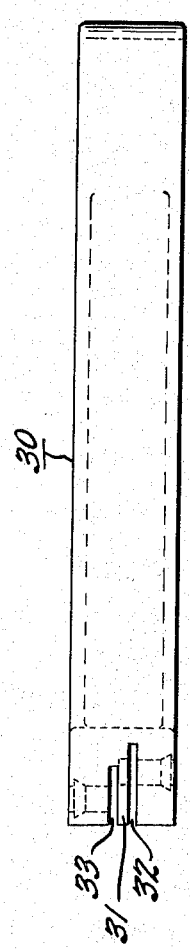
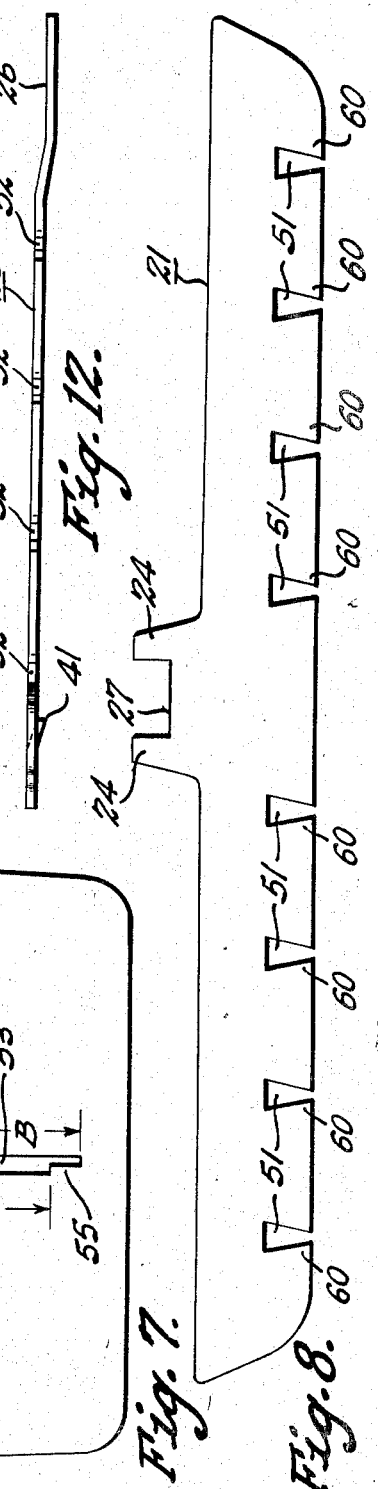
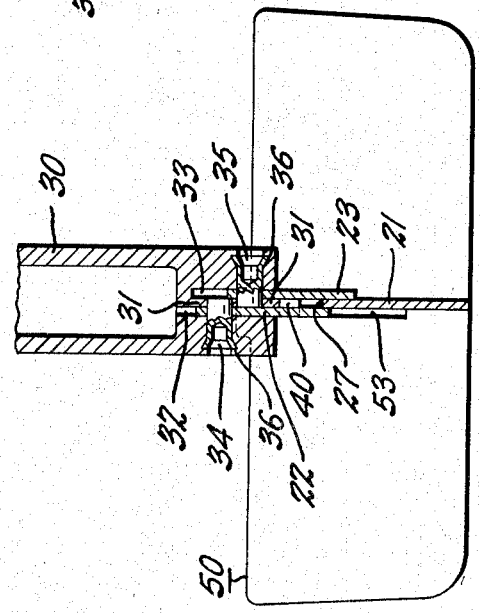
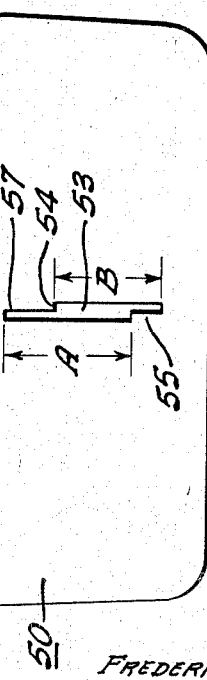
INVENTORS
FREDERICK W. SAMPSON
HARVEY D. GEYER
BY
Spencer Hardman & Fehr
their ATTORNEYS Aug. 18, 1942.   F. W. SAMPSON ET AL   2,293,362
FREEZING TRAY
Filed March 10, 1939   4 Sheets-Sheet 4
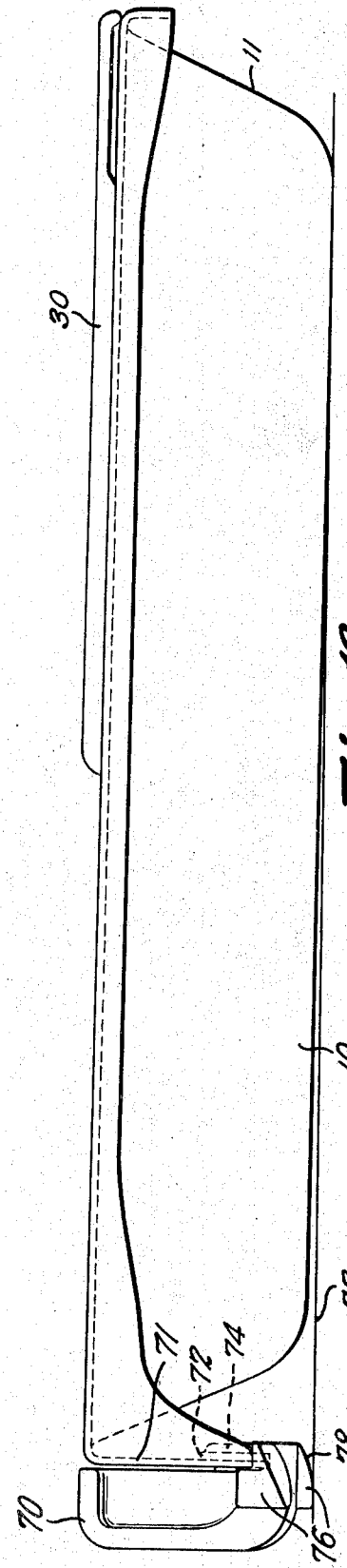
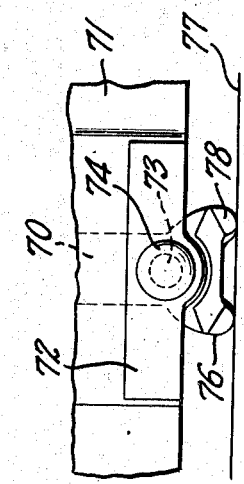
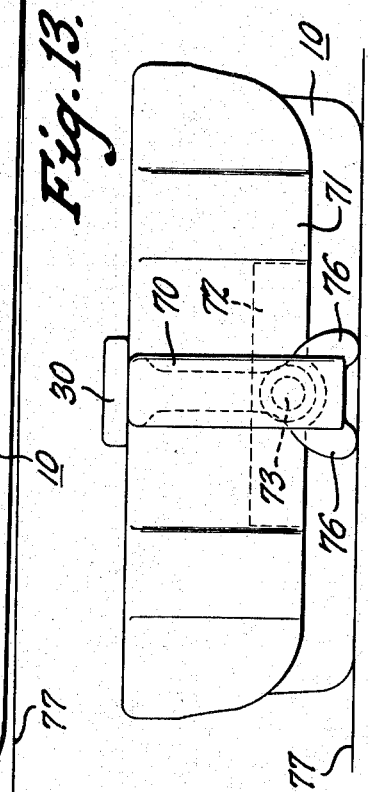
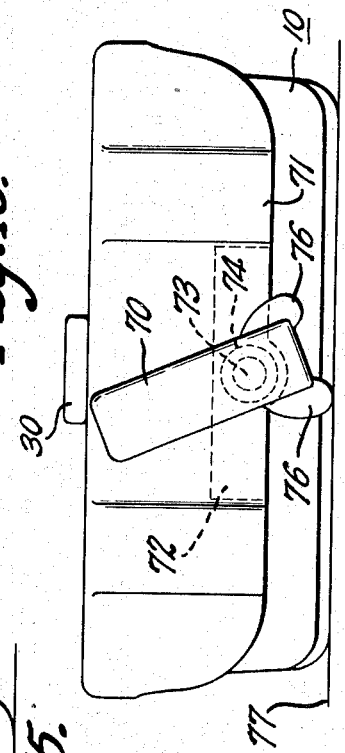
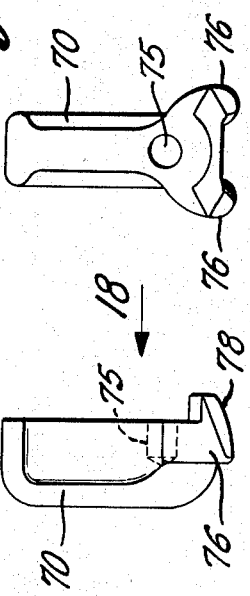
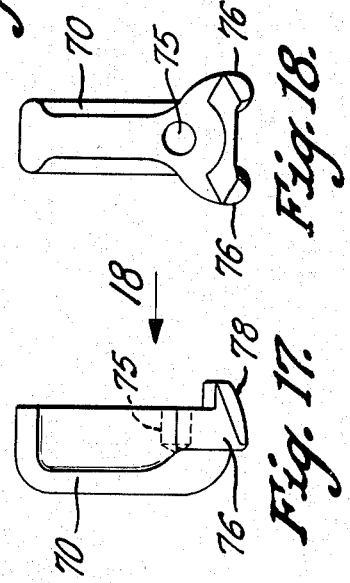
INVENTORS
FREDERICK W. SAMPSON
HARVEY D. GEYER
BY
Spencer Hardman & Fehr
Their ATTORNEYS Patented Aug. 18, 1942

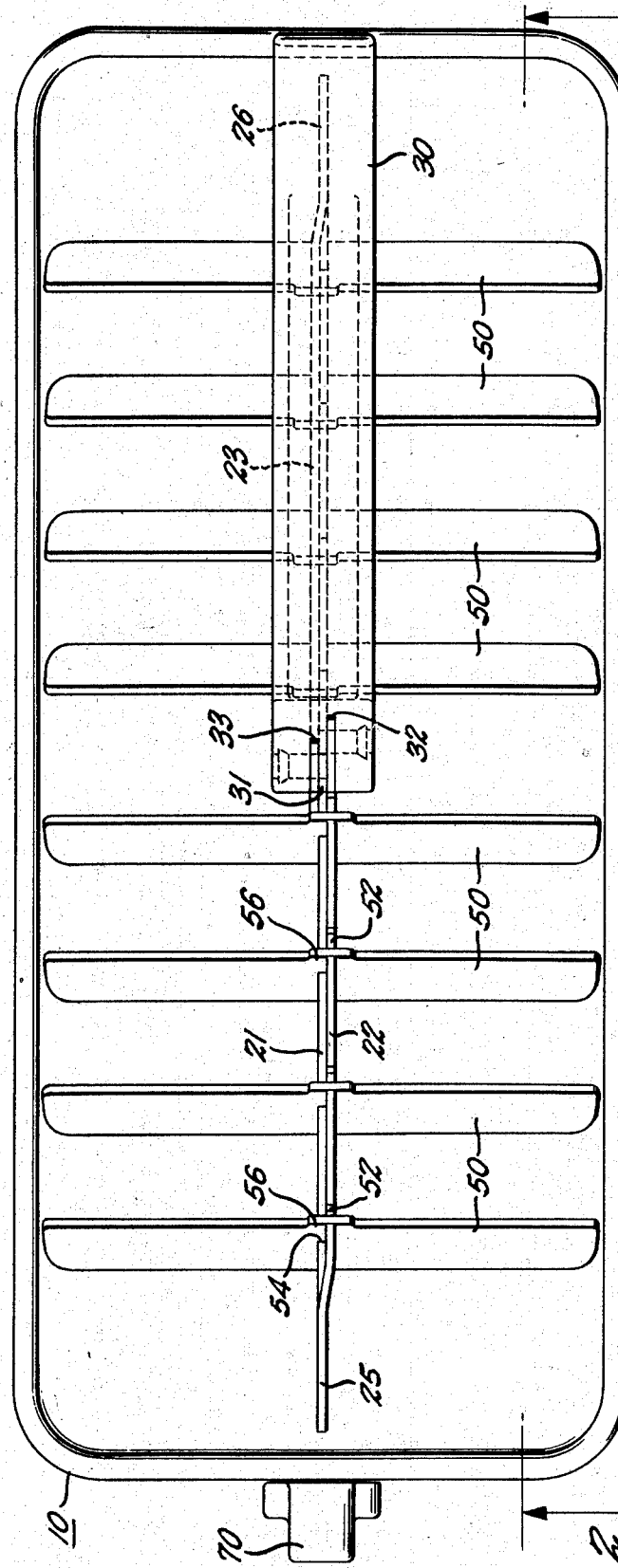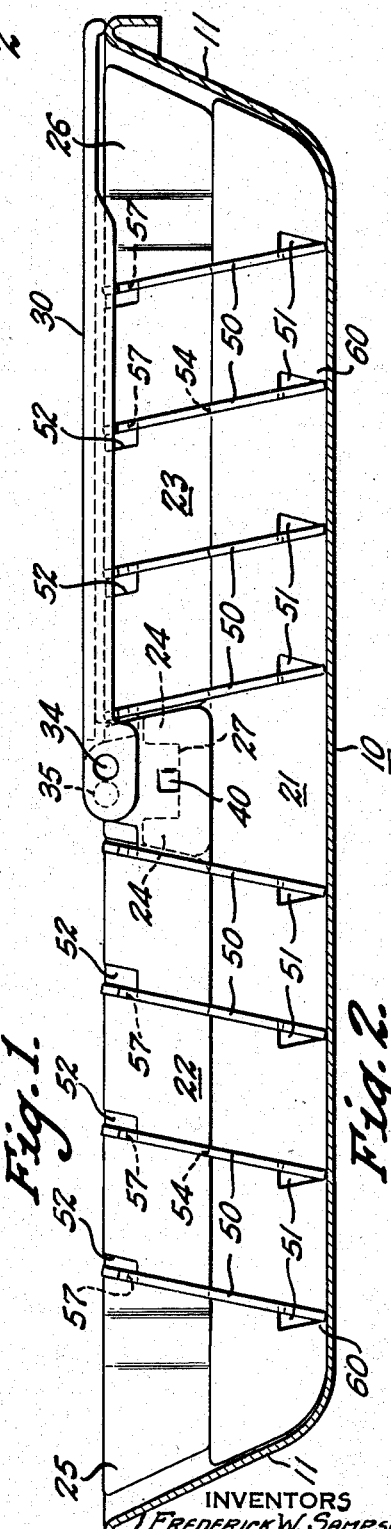

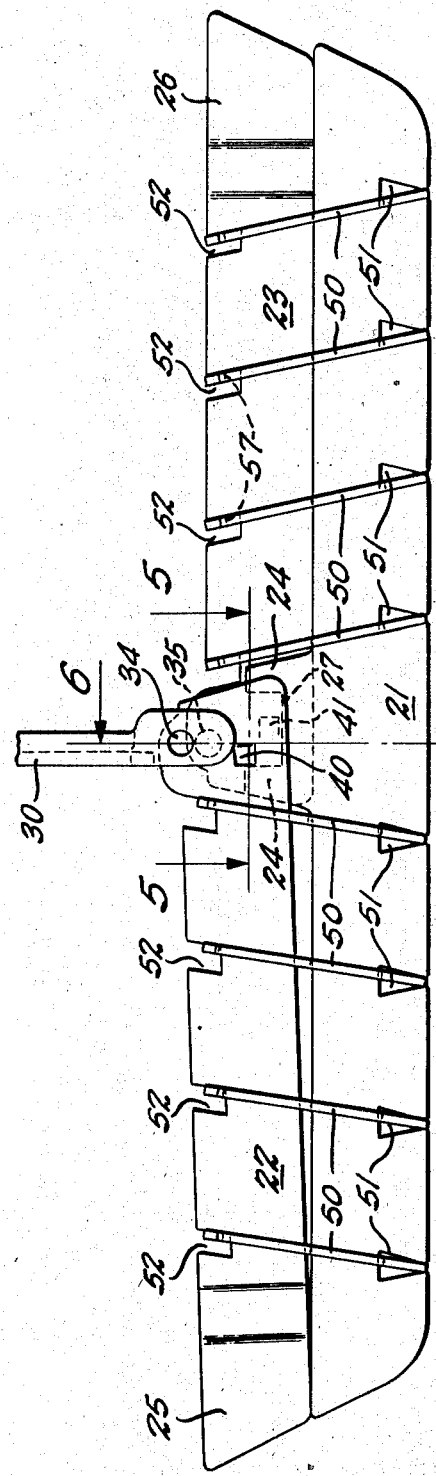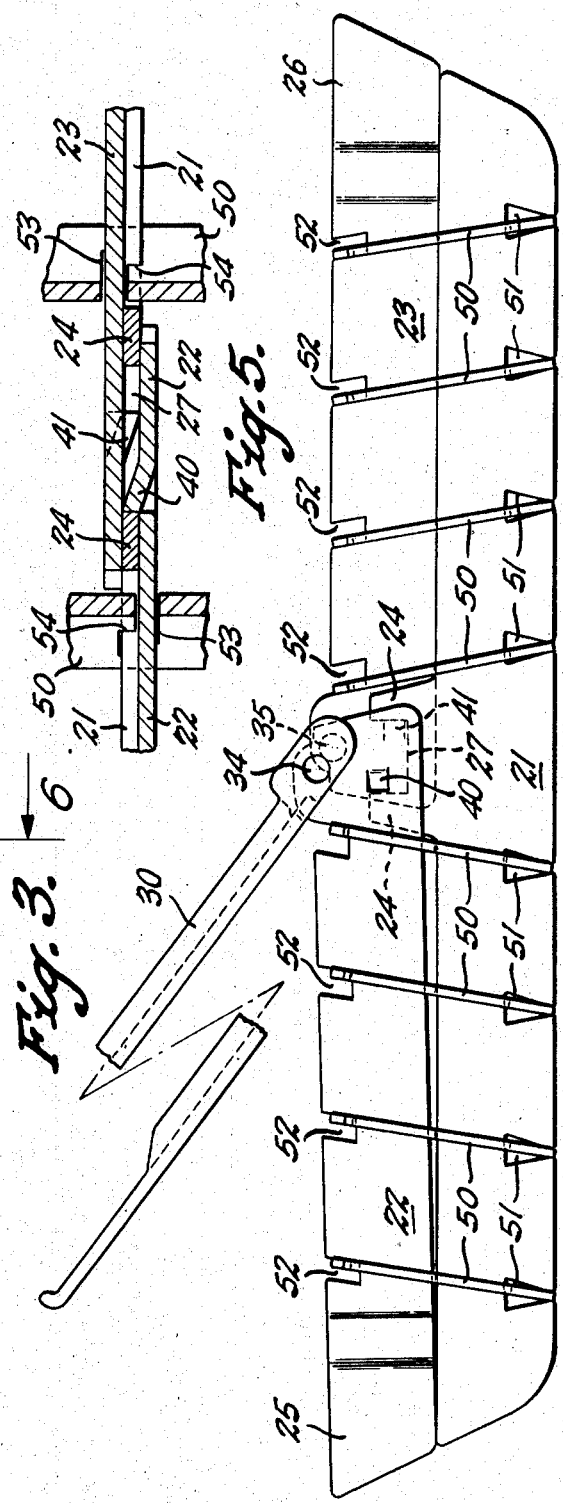

2,293,362

UNITED STATES PATENT OFFICE 2,293,362

FREEZING TRAY

Frederick W. Sampson and Harvey D. Geyer, Dayton, Ohio, assignors to General Motors Corporation, Detroit, Mich., a corporation of Delaware Application March 10, 1939, Serial No. 260,962

10 Claims. (Cl. 62—108.5)

This invention relates to freezing trays, especially to portable freezing trays adapted for use in household refrigerators.

An object of this invention is to provide an improved form of mechanical ice tray from which the ice blocks may be readily removed without first melting the frozen bond of the ice to the pan or grid.

In general, this invention provides various improvements over the disclosure in S. N. 207,437, filed May 12, 1938, and assigned to the assignee of this application.

One feature of the grid of this invention is its expandable composite central longitudinal wall comprising three relatively movable wall members which are spread apart or expanded in area by a hand lever pivoted adjacent the center of said composite wall. This expanding movement of the composite wall members serves first to loosen one or more of said composite wall members from the ice, and thereafter serves to tilt the cross walls and thus complete the loosening of the ice blocks.

Another feature of this invention is the oppositely inclined freezing position of the two groups of cross walls and the tilting of each cross wall angularly upward toward the end of the grid nearest to it. This feature greatly facilitates the loosening of the two endmost ice blocks from the end wall of the pan, as will be obvious, and renders unnecessary any mechanism engaging the pan for loosening the pan from its contents.

Another feature of this invention is the slot arrangement whereby the cross walls and the three wall members of the composite wall may be readily assembled together, and permanently retained in assembled relationship simply by inserting the pivot pins of the hand lever.

Another feature of this invention is the improved form of eccentric pivot connection between the hand lever and the two oppositely moving upper wall members of the composite central wall.

Further objects and advantages of the present invention will be apparent from the following description, reference being had to the accompanying drawings wherein a preferred embodiment of the present invention is clearly shown.

In the drawings:

Fig. 1 is a plan view of the ice tray of this invention, the grid being shown in freezing position in the pan.

Fig. 2 is a section on line 2—2 of Fig. 1.

Fig. 3 shows the grid removed from the pan, and illustrates the position of the grid parts after the ice-ejecting movement of the four cross walls on the left side of this figure.

Fig. 4 illustrates the position of the grid parts after the full ice-ejecting movement of all the grid parts.

Fig. 5 is a section on line 5—5 of Fig. 3 on an enlarged scale.

Fig. 6 is a section on line 6—6 of Fig. 3 and shows the structure of the eccentric pivot connection of the hand lever to the two oppositely movable upper wall members.

Fig. 7 is a detail view of a cross wall.

Fig. 8 is a detail view of the lower longitudinal wall.

Figs. 9 and 10 are detail views of the hand lever.

Fig. 11 is a side elevation of one of the upper movable wall members.

Fig. 12 is a top view of the member of Fig. 11.

Fig. 13 is a side elevation of the pan and grid of Fig. 1.

Fig. 14 is an end elevation of Fig. 13.

Fig. 15 is similar to Fig. 14 but shows the cam handle on the pan moved to its normal vertical position.

Fig. 16 shows the cam handle from the opposite side shown in Fig. 15.

Figs. 17 and 18 are detail views of the cam handle.

Similar reference characters refer to similar parts throughout the several views.

Numeral 10 designates the metal container pan which is preferably a drawn sheet aluminum stamping which is slightly flexible. Pan 10 preferably has its two end walls 11 outwardly inclined at quite an angle as shown in Fig. 2 so that the end-most ice blocks will have a greater tendency to slide upward along these inclined end walls 11 when the end-most cross walls of the grid are tilted angularly upward toward the walls 11 as hereinafter described.

The removable grid comprises a lower central longitudinal division wall 21 and two oppositely movable upper longitudinal division walls 22 and 23, which three walls 21, 22, and 23 together form in effect a composite central longitudinal grid wall which may be expanded in vertical area by relative movement between said three walls 21, 22 and 23. Lower wall 21 extends in a single plane approximately the length of the grid and at its central portion has a raised portion 27 and two spaced upward projections 24. The two upper walls 22 and 23 mutually overlap at their inner ends which also overlap and lie on opposite sides of both projections 24 on lower wall 21, as clearly shown in Fig. 5. The two upper walls 22 and 23 are thus slightly offset from the plane of the lower wall 21 for the greater portion of their lengths but the outer end portions 25 and 26 of walls 22 and 23 respectively are bent laterally inwardly so as to lie in substantially vertical alignment with lower wall 21, as clearly shown in Fig. 1.

The eccentric pivot connection of hand lever 30 to the laterally spaced inner ends of the two upper walls 22 and 23 will now be described. Hand lever 30 has two slots 32 and 33 within which the inner end portions of upper walls 22 and 23 respectively have a neat sliding fit (see Fig. 6). The two slots 32 and 33 are separated by a small integral spacer web 31 on handle 30 which lies in the plane of lower wall 21 and preferably is of the same thickness as lower wall 21. Walls 22 and 23 are pivoted to lever 30 by two eccentric pivot pins 34 and 35 respectively, which pins are inserted from opposite sides of lever 30 and each pin preferably passes thru or nearly thru spacer web 31 but without projecting into the other slot or interfering with the movement of the other movable wall member in its bearing slot. Pins 34 and 35 are shown in Fig. 6 as being solid at their inner bearing portions but hollow at their outer or head ends. These hollow ends of pins 34 and 35 are expanded by a tapered punch until the metal bites into the side wall of the hole as indicated at 36 and thus securely holds the pins fixed in place. The spacer web 31 serves the additional important function of providing a support for the inner ends of pins 34 and 35 and thus greatly increases the sturdiness of the entire lever connection. Of course other forms of pivot pins 34 and 35 may be devised, but in all cases both pivot pins should be positively held against working loose during use and projecting into the bearing slot of the other pivoted wall member and thus causing interference.

It will now be clear that when lever 30 is moved from its normal freezing position (see Fig. 2) to its position shown in Figs. 3 and 6, pivot pin 35 remains stationary while pivot pin 34 moves thru an arc of about 90° and of course simultaneously raises the inner end of upper wall 22 and moves it to the left (as seen in Fig. 3). At this point in the operation further movement of wall 22 to the left is stopped by the stop lug 40 on wall 22 abutting against its projection 24 on lower wall 21. Thereafter further movement of lever 30 to the position shown in Fig. 4 forces pin 35 to move to the right and hence moves the inner end of upper wall 23 to the right until the movement of wall 23 is stopped by stop lug 41 thereon abutting its projection 24 on lower wall 21. During the above described movements of walls 22 and 23 they slide against the opposite lateral surfaces of projections 24, which thus serve as vertical guides for the movable walls 22 and 23.

The upper edge of raised portion 27 lying between projections 24 on lower wall 21 serves as a stop for the down movement of stop lugs 40 and 41. In Fig. 2 both lugs 40 and 41 are centered and lie in substantial contact with the upper edge 27. In Fig. 3 stop lug 41 still overlies and rests upon the upper edge 27 and hence requires that the vertical displacement between pivot pins 34 and 35 takes place by the up-movement of pin 34 moving in an arc about pin 35. This of course lifts the inner end of movable wall 22 a considerable distance while it is being moved longitudinally to the left until its stop lug 40 abuts its projection 24, as shown in Fig. 3. Thereafter during further swinging of handle 30, pin 34 can move no further to the left and hence pin 35 is forced to the right carrying with it the other movable wall 23. Stop lug 41 on wall 23 finally abuts its projection 24 (as shown in Fig. 4) after which there can be no further endwise spreading of movable walls 22 and 23.

A series of cross walls 50 are retained in place at their lower edges by open notches 51 cut in the lower margin of lower wall 21, and at their upper edges by open notches 52 cut in the upper margins of movable walls 22 and 23. Cross walls 50 each have a peculiar shaped central slot 53 (see Fig. 7) thru which the longitudinal walls loosely extend. The portion A of slots 53 is deep enough to permit the full depth of either the lower wall 21 or the upper walls 22 and 23 to pass therethru. To assemble the cross walls 50 with the longitudinal walls, the slot portions A of the cross walls are first threaded over the two ends of lower wall 21 until portions 55 of the cross walls register with and are moved into the notches 51, after which the lower wall 21 is moved laterally into the portion B of slots 53, thereby causing the shoulder 54 of each cross wall 50 to directly overlie lower wall 21 and thus leave the portions A of slots 53 vacant. Next the inner ends of the two movable walls 22 and 23 are passed thru the portions A of slots 53 from opposite ends of the grid (during which passing the walls 22 and 23 slide snugly along on opposite sides of the upper part of the lower wall 21) until the upper central portions 56 of cross walls 50 all register with the notches 52 in the upper edges of walls 22 and 23. During the last portion of this passing the offset end portions 25 and 26 of walls 22 and 23 respectively may be easily deflected or sprung laterally sufficiently to accomplish this assembling without permanently deforming said offset portions 25 and 26. Now after the upper portions 56 of cross walls 50 all fall in registration with the upper notches 52, the walls 22 and 23 may be moved upwardly (thereby causing portions 56 to move into notches 52) until the lower edges of walls 22 and 23 fall above the upper edge of lower wall 21, whereupon the offset end portions 25 and 26 will spring back into normal position directly above lower wall 21, as shown in Fig. 1, and the lateral lugs 40 and 41 on walls 22 and 23 will snap into their normal position overlying raised portion 27 on lower wall 21, as best shown in Fig. 5. To complete the assembling, the handle 30 then has its two slots 32 and 33 slipped over the inner ends of walls 22 and 23 respectively and the pivot pins 34 and 35 are inserted in the manner above described. Thereafter the inner ends of walls 22 and 23 are positively held by handle 30 with a snug sliding fit upon opposite sides of projections 24 on lower wall 21 and are thus guided to move only in a vertical plane when actuated by handle 30 as described hereinabove.

Preferably, the cross walls 50 at opposing ends of the grid are oppositely inclined when in freezing position, as shown in Fig. 2. Cross walls 50 are retained in this inclined position by the triangular shape of lower notches 51 in lower wall 21, that is to say, cross walls 50 are held against further tilting toward the grid center by the bottom toes 60 of lower wall 21 abutting the lower margin of said cross walls as shown in Fig. 2. Thus the top portions 56 of all the cross walls 50 are caused to contact the outer edges of all the upper notches 52, thereby permitting the initial spreading movement of upper walls 22 and 23 to take place prior to any tilting movement of any cross wall 50. Preferably notches 52 are made progressively wider from the two opposite ends of the grid toward the grid center. Hence upon the endwise movement of each of walls 22 and 23 by the operation of handle 30 as described above, the endmost cross wall 50 will be first tilted forward toward the end of the pan 10, and thereafter the remaining cross walls actuated by that particular movable wall, 22 or 23, will be tilted forward successively. This facilitates ease of operation of the grid to eject the frozen ice blocks therefrom in a progressive manner.

In operation, the grid is placed in pan 10 in the position shown in Figs. 1 and 2, either before or after the pan has been filled with water to the desired level. After the ice is solidly frozen in a freezing compartment of a refrigerator the pan is removed and the handle 30 actuated to eject the ice blocks from the pan and grid. Since pin 35 is restrained against down movement by the ice underlying its movable wall 23, the initial movement of handle 30 causes pin 34 to move upwardly in an arc about pin 35 and thus first loosens movable wall 22 from its ice bond prior to any tilting movement of the end-most cross wall 50 on wall 22. It should be here noted that the tops 57 of central slots 53 in cross walls 50 sufficiently clear the bottoms of notches 52 in upper walls 22 and 23, when all the parts are in freezing position, as to permit a substantial upward sliding of upper walls 22 and 23 within portions A of the slots 53. As pin 34 continues to swing in an arc about pin 35, the next action is the forward tilting of the endmost cross wall 50 on wall 22, which thus forces the two endmost ice blocks against the inclined end wall 11 of pan 10 and thereby cams these two ice blocks upwardly from the pan. Further motion of handle 30 successively tilts forward the other three cross walls 50 on wall 22 and successively releases three more pairs of ice blocks. After stop 40 abuts projection 24 (as shown in Fig. 3) there can be no further endwise movement of wall 22, hence further movement of handle 30 causes pin 35 to move to the right (as seen in Figs. 3 and 4) and thus move wall 23 to the right and successively tilt the four cross walls 50 thereon toward the right end of the grid in a similar manner to release the ice blocks in that half of the grid. It will be noted that the reaction of the ice blocks on the cross walls 50 during the ejecting operation tends to hold the grid unit down in pan 10 rather than to force the grid upwardly out of pan 10. It may happen that the two endmost ice blocks react downwardly upon the inclined end wall 11 of the pan with sufficient force to strip the entire pan 10 loose from its ice contents. Even in this event it is not necessary nor desirable to lift the grid from the pan in order to complete the ejecting operation as above described. Normally the hand lever 30 is simply swung to the position of Fig. 4 to loosen all the ice blocks from both grid and pan, after which the grid may be lifted vertically upward from the pan by the lever 30, which permits all the ice blocks to slide from the grid and remain loosely in pan 10.

Figs. 13 to 18 show additional details of the structure of pan 10 and its movable pivot handle 70, although these details are in no wise essential to the efficient operation of grid as heretofore described, since any suitable form of container pan may be used with the grid of this invention. Pan 10 is shown with an integral downturned vertical front flange 71 which has a separate reinforcing metal plate 72 welded thereto along its lower inner face. A die-cast metal handle 70 is pivotally mounted to front flange 71 near its lower edge by means of pivot pin 73 which extends thru reinforcing plate 72. Pivot pin 73 is inserted with a pressed fit into the hole 75 in handle 70 (see Fig. 17) from the inside of flange 71, thus leaving head 74 of pin 73 to turn loosely upon the inner face of plate 72. Handle 70 has integral therewith two laterally offset cam lobes 76 whose bottom tips lie substantially flush with the bottom of pan 10 when handle 70 is in vertical position (see Fig. 15). Now when handle 70 is swung laterally about pivot 73 to either side, one or the other of cam lobes 76 will engage the surface 77 upon which pan 10 rests and thus force pan 10 upwardly from its supporting surface 77 (see Fig. 14). This is for the purpose of loosening pan 10 from its frozen bond to the shelf upon which it rests during freezing of its contents. As soon as handle 70 is released the two cam lobes 76, in conjunction with the weight of the tray, will again maintain handle 70 in its normal vertical position as seen in Fig. 15. Preferably the lower surfaces of cam lobes 76 are inclined upwardly toward the pan as shown at 78 in Fig. 17. This is for the purpose of causing the depressed cam lobe to easily ride up over the edge of the supporting shelf 77 if the pan 10 should be slid to its freezing position on its supporting shelf 77 while handle 70 is in its inclined position. Otherwise the depressed cam lobe 76 would form an abrupt shoulder to abut the outer edge of the supporting shelf 77 and thus render it necessary to lift pan 10 slightly before it could be slid to its final position. Fig. 13 shows handle 70 in its maximum inclined position and illustrates how the inclined surface 78 on the depressed cam lobe 76 avoids any abrupt shoulder extending below the plane of the bottom surface of pan 10.

While the embodiment of the present invention as herein disclosed, constitutes a preferred form, it is to be understood that other forms might be adopted, all coming within the scope of the claims which follow.

What is claimed is as follows:

1. In a freezing tray, a container pan and a partition grid for said pan, said grid comprising: a lower longitudinal division wall, two oppositely movable upper longitudinal division walls, a series of movable cross walls cooperating with said longitudinal walls to form ice block compartments, some of said cross walls being engageable and movable by one of said upper longitudinal walls and some by the other of said upper longitudinal walls, and force-multiplying means for moving said two upper division walls in opposite directions to facilitate the removal of ice blocks from said grid.

2. In a freezing tray, a container pan and a partitioning grid for said pan, said grid comprising: a lower longitudinal division wall, two oppositely movable upper longitudinal division walls, having overlapping portions near the longitudinal center of the grid, a hand lever pivoted to each of said overlapping portions at eccentric pivot points and operable to move said two upper division walls in opposite longitudinal directions relative to said lower wall, and a series of cross walls associated with each of said upper division walls in such manner as to be moved thereby toward opposite ends of said grid.

3. In a freezing tray, a container pan and a partitioning grid for said pan, said grid comprising: a lower longitudinal division wall, two oppositely movable upper longitudinal division walls, having overlapping portions near the longitudinal center of the grid, a hand lever pivoted to each of said overlapping portions at eccentric pivot points and operable to move said two upper division walls in opposite longitudinal directions relative to said lower wall, said two upper walls having spaced notches in their upper edges, and a series of cross walls each having a portion lying within one of said notches so as to be moved by the longitudinal movement of said upper division walls.

4. In a freezing tray, a container pan and a partitioning grid for said pan, said grid comprising: a lower longitudinal division wall, two oppositely movable upper longitudinal division walls, having overlapping portions near the longitudinal center of the grid, a hand lever pivoted to each of said overlapping portions at eccentric pivot points and operable to move said two upper division walls in opposite longitudinal directions relative to said lower wall, and a series of longitudinally tiltable cross walls each retained in place by said lower wall and one of said upper walls to form ice block compartments, said cross walls being tiltable longitudinally of the grid by the longitudinal movement of said upper division walls.

5. In a freezing tray, a container pan and a removable grid for said pan, said grid comprising: a lower longitudinal division wall, two opposed upper longitudinal walls slightly offset from the plane of said lower wall and having mutually overlapping portions near the longitudinal center of the grid, a hand lever associated with said overlapping portions and operable to move said two upper walls toward opposite ends of said grid, and a series of cross walls each having a shouldered slot thru which said lower and one of said upper division walls loosely extend, the shoulders on said slots being arranged to overlie the upper edge of said lower wall and limit downward movement of said cross walls relative to said lower wall.

6. In a freezing tray, a container pan and a removable grid for said pan, said grid comprising: a lower longitudinal division wall, two opposed upper longitudinal walls slightly offset from the plane of said lower wall and having mutually overlapping portions near the longitudinal center of the grid, a hand lever associated with said overlapping portions and operable to move said two upper walls toward opposite ends of said grid, and a series of cross walls each loosely retained upon said lower and one of said upper division walls and being capable of a tilting movement relative thereto, said two upper division walls having a series of spaced notches in their upper edges which upon longitudinal movement thereof engage and tilt said cross walls to facilitate ejection of the ice blocks.

7. A removable partitioning grid for a freezing tray, said grid comprising: a lower longitudinal wall extending substantially the length of the grid, two oppositely movable upper longitudinal walls having mutually overlapping portions near the center of the grid, said main lower wall and two upper walls forming a composite longitudinal division wall, a series of cross walls each loosely retained upon said composite wall and capable of being tilted toward an end of the grid, said two upper walls having means thereon which upon the longitudinal movement of said upper walls engage and tilt said cross walls, and force-multiplying means for forcing said two upper walls to move toward opposite ends of the grid.

8. A removable partitioning grid for a freezing tray, said grid comprising: a lower longitudinal wall extending substantially the length of the grid, two oppositely movable upper longitudinal walls having mutually overlapping portions near the center of the grid, said main lower wall and two upper walls forming a composite longitudinal division wall, a series of cross walls each loosely retained upon said composite wall and capable of being tilted toward an end of the grid, said two upper walls having means thereon which upon the longitudinal movement of said upper walls engage and tilt said cross walls, and a hand lever pivoted to each of said overlapping portions on non-aligned pivot axes and operable to force said two upper walls toward opposite ends of the grid.

9. A removable partitioning grid for a freezing tray, said grid comprising: a lower longitudinal wall extending substantially the length of the grid, two oppositely movable upper longitudinal walls having mutually overlapping portions near the center of the grid, said main lower wall and two upper walls forming a longitudinal composite division wall, a series of cross walls each loosely retained upon said composite wall and capable of being tilted toward an end of the grid, said two upper walls having means thereon which upon the longitudinal movement of said upper walls engage and tilt said cross walls, and stop means reacting upon said lower wall to limit the longitudinal movement of at least one of said upper walls.

10. In a freezing tray, a container pan and a partitioning grid for said pan, said grid comprising: a composite longitudinal division wall comprising one substantially full-length longitudinal wall member and two relatively movable part-length longitudinal wall members, and a series of individually loose cross walls cooperating with said composite wall to form ice block compartments, said cross walls being so associated with said composite wall as to be moved to loosen the frozen ice blocks by relative movement between said wall members which form said composite wall, and force-multiplying means for causing relative movement between said wall members which form said composite wall in order to loosen the frozen ice blocks from said grid.

FREDERICK W. SAMPSON.
HARVEY D. GEYER.